(12) United States Patent
Royere et al.

(10) Patent No.: US 12,347,579 B2
(45) Date of Patent: Jul. 1, 2025

(54) METHOD FOR MONITORING A NUCLEAR CORE COMPRISING A RELAXATION OF A THRESHOLD, AND ASSOCIATED PROGRAMME, SUPPORT AND NUCLEAR REACTOR

(71) Applicant: FRAMATOME, Courbevoie (FR)

(72) Inventors: Christian Royere, Clamart (FR); Christophe Lasne, Puteaux (FR)

(73) Assignee: FRAMATOME, Courbevoie (FR)

( * ) Notice: Subject to any disclaimer, the term of this patent is extended or adjusted under 35 U.S.C. 154(b) by 604 days.

(21) Appl. No.: 16/634,365

(22) PCT Filed: Jul. 30, 2018

(86) PCT No.: PCT/EP2018/070608
§ 371 (c)(1),
(2) Date: Jan. 27, 2020

(87) PCT Pub. No.: WO2019/020836
PCT Pub. Date: Jan. 31, 2019

(65) Prior Publication Data
US 2021/0098139 A1    Apr. 1, 2021

(30) Foreign Application Priority Data

Jul. 28, 2017 (FR) ................. FR 17 57237

(51) Int. Cl.
| G21D 3/08 | (2006.01) |
| G21C 3/04 | (2006.01) |
| G21C 7/00 | (2006.01) |
| G21C 7/36 | (2006.01) |

(52) U.S. Cl.
CPC ............. *G21D 3/08* (2013.01); *G21C 3/047* (2019.01); *G21C 7/00* (2013.01); *G21C 7/36* (2013.01)

(58) Field of Classification Search
CPC .......... G21C 3/047; G21C 3/326; G21C 7/00; G21C 7/36; G21C 17/10; G21C 17/108; G21D 3/00; G21D 3/08; G21D 3/002
USPC .................................................. 376/215–217
See application file for complete search history.

(56) References Cited

U.S. PATENT DOCUMENTS

| 3,979,255 A * | 9/1976 | Bulgier ................. H02H 1/04 376/215 |
| 4,057,466 A * | 11/1977 | Thompson ............... G21C 7/00 376/217 |
| 6,430,247 B1 | 8/2002 | Mourlevat et al. |
| 7,260,512 B2 * | 8/2007 | Mahe ..................... G21C 17/00 703/2 |
| 2009/0080585 A1 * | 3/2009 | Farawila ................ G21C 17/00 376/217 |
| 2010/0260300 A1 | 10/2010 | Andre Poyaud et al. |
| 2013/0301772 A1 | 11/2013 | Fedosovsky et al. |

FOREIGN PATENT DOCUMENTS

| DE | 2753028 A1 | 5/1979 | |
| FR | 2796196 | 1/2001 | |
| FR | 2924852 | 6/2009 | |
| FR | 2946454 A1 * | 12/2010 | ............ G21C 17/00 |
| JP | S55065195 A | 5/1980 | |
| JP | S57135397 A | 8/1982 | |
| RU | 2528401 C1 | 9/2014 | |
| RU | 2538298 C2 | 1/2015 | |
| RU | 2574578 C2 | 2/2016 | |
| WO | WO-2010142693 A1 * | 12/2010 | ............... G21D 3/04 |

OTHER PUBLICATIONS

Nuclear Energy Institute, "Managing Personnel Fatigue at Nuclear Power Reactor Sites," NEI 06-11, 2008 (Year: 2008).*
Maldonado, G. Ivan, et al. "Non-standard constraints within in-core fuel management." (2004). (Year: 2004).*
Alapour, Adel, et al. "Robust PCI Monitoring During PWR Operation at Southern Nuclear." Proc. 2010 LWR Fuel Performance/TopFuel/WRFPM (2010): 26-29. (Year: 2010).*
FAQ 13-02 (Tentative NRC Response) Susquehanna Power Change, Revised Oct. 21, 2013 (Year: 2013).*
Pennsylvania Power & Light Company, Susquehanna SES Unit 1 Cycle 4 Reload Summary Report, May 1987 (Year: 1987).*
Corresponding Search Report PCT/EP2018/070608.
Corresponding French Search Report for FR 17 57237.

* cited by examiner

*Primary Examiner* — Jack W Keith
*Assistant Examiner* — Jinney Kil
(74) *Attorney, Agent, or Firm* — Davidson Kappel LLC

(57) ABSTRACT

A method is for monitoring a nuclear reactor comprising a core in which fuel assemblies are loaded, each assembly comprising nuclear fuel rods each including nuclear fuel pellets and a cladding surrounding the pellets. The method includes determining (100) at least one operating time limit ($T^{FPPI}$) for the extended reduced power operation of the reduced power nuclear reactor, so as to avoid a rupture of at least one of the claddings, operating (102) the nuclear reactor at reduced power for an actual time strictly less than the time limit ($T^{FPPI}$), and relaxing (104) at least one threshold for protecting the nuclear power plant as a function of a difference between the time limit ($T^{FPPI}$) and the actual time.

19 Claims, 4 Drawing Sheets

METHOD FOR MONITORING A NUCLEAR CORE COMPRISING A RELAXATION OF A THRESHOLD, AND ASSOCIATED PROGRAMME, SUPPORT AND NUCLEAR REACTOR

The present invention relates to a method for monitoring a nuclear reactor comprising a core in which fuel assemblies are loaded, each assembly comprising nuclear fuel rods each including nuclear fuel pellets and a cladding surrounding the pellets.

The invention for example applies to pressurized water reactors.

BACKGROUND

Conventionally, the core of such a reactor is loaded with nuclear fuel assemblies.

Each assembly comprises a bundle of nuclear fuel rods, the rods comprising a cladding containing nuclear fuel pellets.

It may be useful, in particular in countries such as France, where 80% of electricity is produced using nuclear reactors, for the overall power supplied by reactors to vary in order to adapt to the needs of the electrical grid that they supply.

In particular, it is desirable to be able to operate the reactors at a reduced overall power during a long period where the demand of the grid is low, before returning, if necessary, to nominal overall power.

For all that, such an operation of each reactor, which makes it possible to better use its capacities, must not cause safety problems.

One of the phenomena limiting the maneuverability of nuclear reactors is in particular the Pellet/Cladding Interaction (PCI).

Indeed, when the reactor is operating at its nominal overall power PN, the nuclear fuel rods are, according to the term used in the art, conditioned.

For a given rod, conditioning is essentially characterized by the closing of the radial play between the pellets and the cladding, due to the creep of the cladding and the swelling of the pellets.

While there is no risk of rupture of the cladding in a steady state due to the thermomechanical equilibrium in the cladding at fairly low stress levels, a risk nevertheless appears once the power supplied by the rod in question varies greatly and quickly.

Indeed, a local power increase generates a temperature increase in the rod. Given the difference in mechanical characteristics (thermal expansion coefficient, Young's modulus) and the temperature difference between the uranium oxide-based pellet and the cladding typically made from zirconium alloy, the pellet will expand more than the cladding and impose its deformation on the latter.

Furthermore, the presence of corrosive fission products, such as iodine, in the space between the cladding and the pellet creates the conditions for corrosion under stress. Thus, the deformation imposed by the pellet on the cladding during a global power transition can cause a rupture of the cladding.

This risk of cladding rupture during a power transition is exacerbated when the rods are no longer conditioned, that is to say, when there is no longer a thermomechanical equilibrium between the pellet and the cladding. This equilibrium rupture appears during the return to nominal power after extended operation at intermediate power.

Indeed, when the power drops, the temperature decreases more greatly in the pellet than in the cladding, causing a reopening of the radial play due to the differential expansion. If the reactor stays at intermediate power, this play decreases due to the creep of the cladding inward, since the pressure of the primary fluid is greater than the inner pressure of the rods. When the reactor returns to nominal pressure, the pellet then exerts inward pressure on the cladding, from which a stress field then appears. If a power increase spike occurs at this moment, it then leads to a risk of earlier cladding rupture. This is then called deconditioning of the fuel. This deconditioning is even greater when the reactor operates for a long time at intermediate power.

Yet such a rupture of the cladding is not acceptable for safety reasons, since it may result in the release of fission products into the primary circuit of the nuclear reactor.

Patent application FR 2,924,852 discloses a method for determining the value of a parameter representative of the maneuverability of a nuclear reactor.

This method thus makes it possible to define operating fields in which the nuclear reactor can operate safely, even if an accidental overall power spike occurs.

However, certain operating margins are restrictive for the operation of the reactors, in particular in Extended Reduced Power Operation (ERPO).

In France, extended reduced power operation is more specifically defined as being the operation of the reactor in a steady state, at an overall power PI for example less than or equal to about 92% of its nominal power PN for example over a cumulative duration of more than 8 h, for example more than 12 hours, per sliding 24 h range.

This in particular makes it possible to adapt electricity production on demand.

SUMMARY

One aim of the present disclosure is to increase the maneuverability of the reactor while guaranteeing safe operation over the course of the operation of the core.

To that end, a monitoring method of the aforementioned type is provided, comprising the following steps:
   determining at least one operating time limit for the operation at a reduced power of the nuclear reactor, so as to avoid a rupture of at least one of the claddings,
   operating the nuclear reactor at the reduced power for an actual time strictly less than the time limit, and
   relaxing at least one protection threshold of the nuclear power plant as a function of a difference between the time limit and the actual time.

According to specific embodiments of the invention, the monitoring method has one or more of the following features, considered alone or according to any technically possible combination(s):
   the protection threshold is a threshold of a linear power at any point of the core,
   the method comprises a step for determining a relationship of the relaxing of the protection threshold as a function of the difference between the time limit and the actual time, the determination of the relationship of the relaxing being done before operating the reactor,
   the method comprises the following steps before determining the operating time limit:
   calculating a threshold linear power, and
   calculating a linear power at 100% corresponding to an estimate of the linear power at any point of the core and as a function of time if the reactor is operating at nominal power from a measurement and/or a calculation of the distribution of the actual power at any point of the core as a function of time, the determination of the time limit being made as a function of the difference between the threshold linear power and the linear power at 100%, the threshold linear power is calculated at any point of the core and as a function of time, the power distribution of the core being such that at any point of the core, a linear power is below the threshold linear power, the method comprises the following steps before calculating the threshold linear power:

calculating a rupture linear power at any point of the core and as a function of time, and calculating a maximum linear power variation at any point of the core caused by accidental spikes, the threshold linear power being equal to the difference between the rupture linear power and the maximum variation induced by accidental spikes, the rupture linear power is calculated by a thermomechanical code from a thermomechanical state of the core, the thermomechanical state of the core being known by the measurement and/or the calculation of the distribution of the power at any point of the core as a function of time, and/or the calculation of the rupture linear power is done at least once every two hours, the threshold linear power then also being recalculated.

A computer program comprising instructions for executing steps of a method as defined above is also provided.

A medium usable in a computer and on which a program as defined above is recorded is also provided.

A nuclear reactor is also provided comprising:

a core in which fuel assemblies are loaded, each assembly comprising nuclear fuel rods each including nuclear fuel pellets and a cladding surrounding the pellets, and a computer configured to carry out the following steps:

determining at least one operating time limit for the operation at a reduced power of the nuclear reactor, so as to avoid a rupture of at least one of the claddings, operating the nuclear reactor at the reduced power for an actual time strictly less than the time limit, and relaxing at least one protection threshold of the nuclear power plant as a function of a difference between the time limit and the actual time.

BRIEF SUMMARY OF THE DRAWINGS

Other features and advantages of the invention will appear upon reading the following description, provided solely as an example and done in reference to the appended drawings, in which.

DETAILED DESCRIPTION

Figure 1:
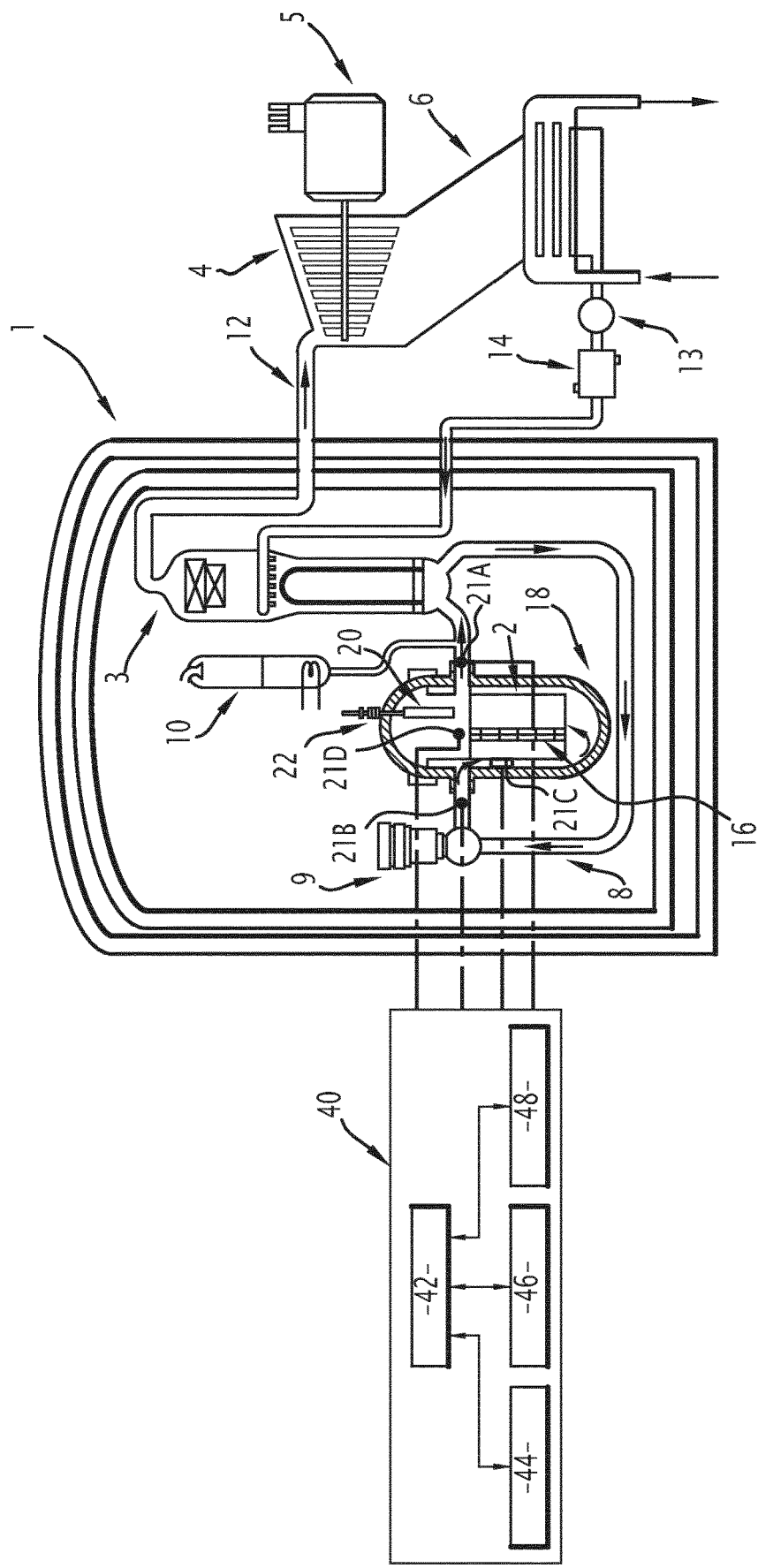
FIG. 1 is a schematic view of a pressurized water nuclear reactor.

FIG. 1 schematically illustrates a pressurized water nuclear reactor 1 that conventionally comprises:

a core 2, a steam generator 3, a turbine 4 coupled to an electric energy generator 5, and a condenser 6.

The reactor 1 comprises a primary circuit 8 equipped with a pump 9 and in which pressurized water circulates, along a path embodied by the arrows in FIG. 1. This water in particular rises through the core 2 to be heated therein while providing the refrigeration of the core 2.

The primary circuit 8 further comprises a pressurizer 10 making it possible to pressurize the water circulating in the primary circuit 8 and to control said pressure.

The water of the primary circuit 8 also supplies the steam generator 3, where it is cooled while providing the vaporization of water circulating in a secondary circuit 12.

The steam produced by the generator 3 is channeled by the secondary circuit 12 toward the turbine 4, then toward the condenser 6, where this steam is condensed by indirect heat exchange with the cooling water circulating in the condenser 6.

The secondary circuit 12 comprises, downstream from the condenser 6, a pump 13 and a heater 14.

Also conventionally, the core 2 comprises nuclear fuel assemblies 16 that are loaded in a vessel 18. A single assembly 16 is shown in FIG. 1, but the core 2 for example comprises 157 assemblies 16.

The reactor 1 comprises control clusters 20 that are positioned in the vessel 18 above certain assemblies 16. A single cluster 20 is shown in FIG. 1, but the core 2 can for example comprise about 60 clusters 20.

The clusters 20 can be moved by mechanisms 22 to be inserted into the fuel assemblies 16 that they overhang.

Conventionally, each control cluster 20 comprises rods including one or several materials absorbing neutrons.

Thus, the vertical movement of each cluster 20 makes it possible to adjust the reactivity of the reactor 1 and allows variations of the overall power P supplied by the core 2 from the nil power to the nominal power PN, as a function of the pushing of the clusters 20 into the assemblies 16.

Some of these clusters 20 are intended to regulate the operation of the core 2, for example in terms of power or temperature, and are called control clusters. Others are intended only to stop the reactor 1 and are called stop clusters.

The clusters 20 are joined into groups based on their nature and intended use. For example, for the majority of reactors of type 900 MWe, these groups are called groups G1, G2, N1, N2, R, SA, SB, SC, SD, etc.

The reactor 1 also comprises a certain number of sensors for measuring actual values of operating parameters of the reactor, in particular a thermocouple 21A for measuring the average temperature of the water of the primary circuit at the outlet of the vessel 18 and a thermocouple 21B for measuring the average temperature of the water of the primary circuit at the inlet of the vessel 18.

Also conventionally, the nuclear reactor 1 comprises outer chambers 21C for measuring the neutron flux, wherein said chambers 21C are arranged around the vessel 18 of the core 2. The number and positions of the chambers 21C, typically called "excore chambers", vary as a function of the model of the reactor 1.

Also conventionally, the reactor 1 comprises thermocouples 21D arranged in the core 2 above assemblies 16 for measuring the temperature of the water of the primary circuit at the outlet of the assemblies 16. A single chamber 21C and a single sensor 21D have been shown in FIG. 1.

Furthermore, certain reactors also comprise fixed inner chambers for measuring the neutron flux (not shown), these chambers being arranged inside certain fuel assemblies placed in the core. The number and positions of these chambers, typically called "incore chambers", vary as a function of the model of the reactor.

The excore chambers 21C and the thermocouples 21D or the fixed "incore" chambers provide information relative to the three-dimensional distribution of the local power in the core.

Application FR 2,796,196 for example discloses a method for obtaining the distribution of the three-dimensional power.

Figure 2:
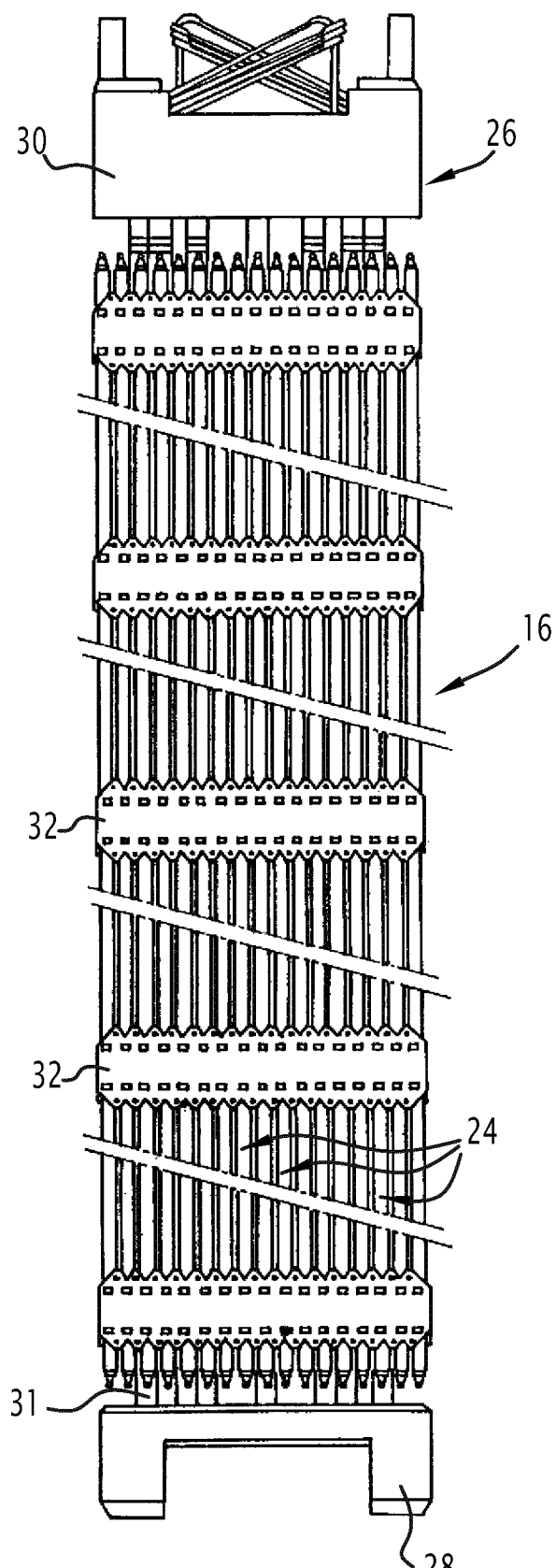
FIG. 2 is a lateral schematic view of a fuel assembly of the core of the reactor of FIG. 1.

As illustrated by FIG. 2, each assembly 16 traditionally comprises an array of nuclear fuel rods 24 and a support skeleton 26 for the rods 24.

The skeleton 26 conventionally comprises a lower end-piece 28, an upper end-piece 30, guide-tubes 31 connecting the two end-pieces 30 and 28 and designed to receive rods of the control clusters 20 and spacer grids 32.

Figure 3:
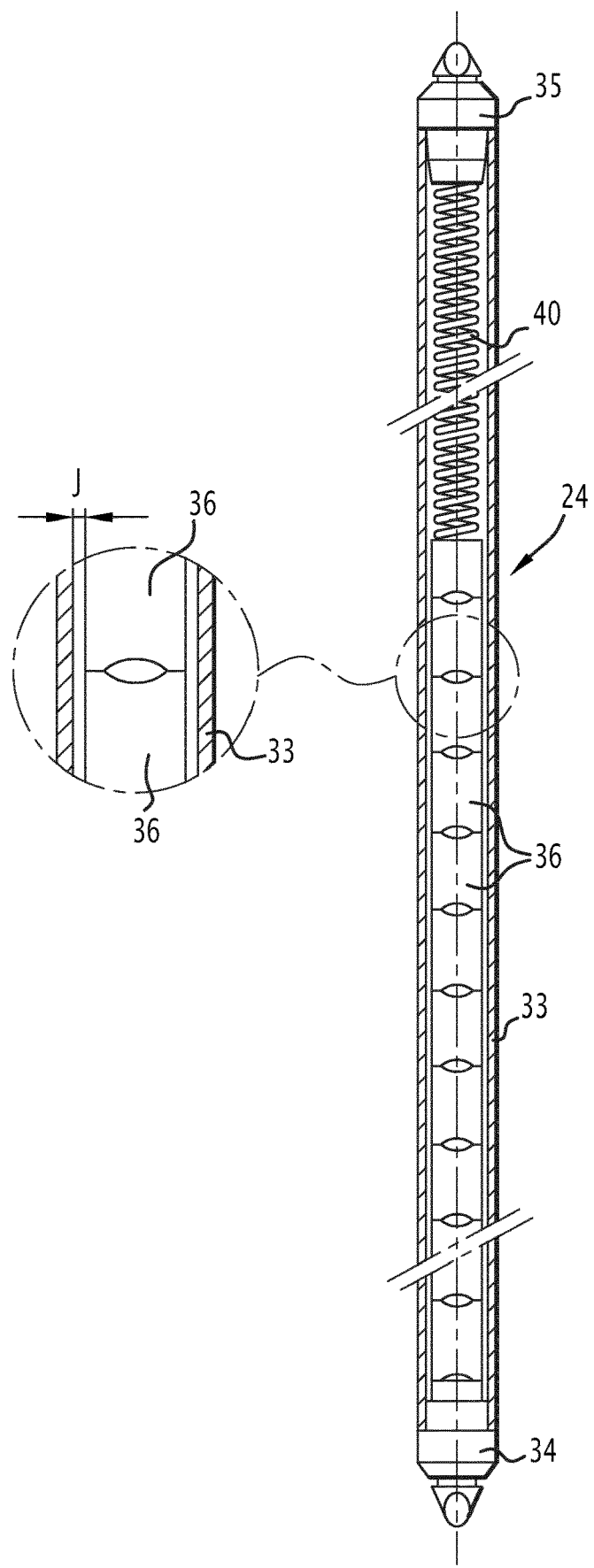
FIG. 3 is a longitudinal sectional schematic view of a fuel rod of the assembly of FIG. 2.
Figure 4:
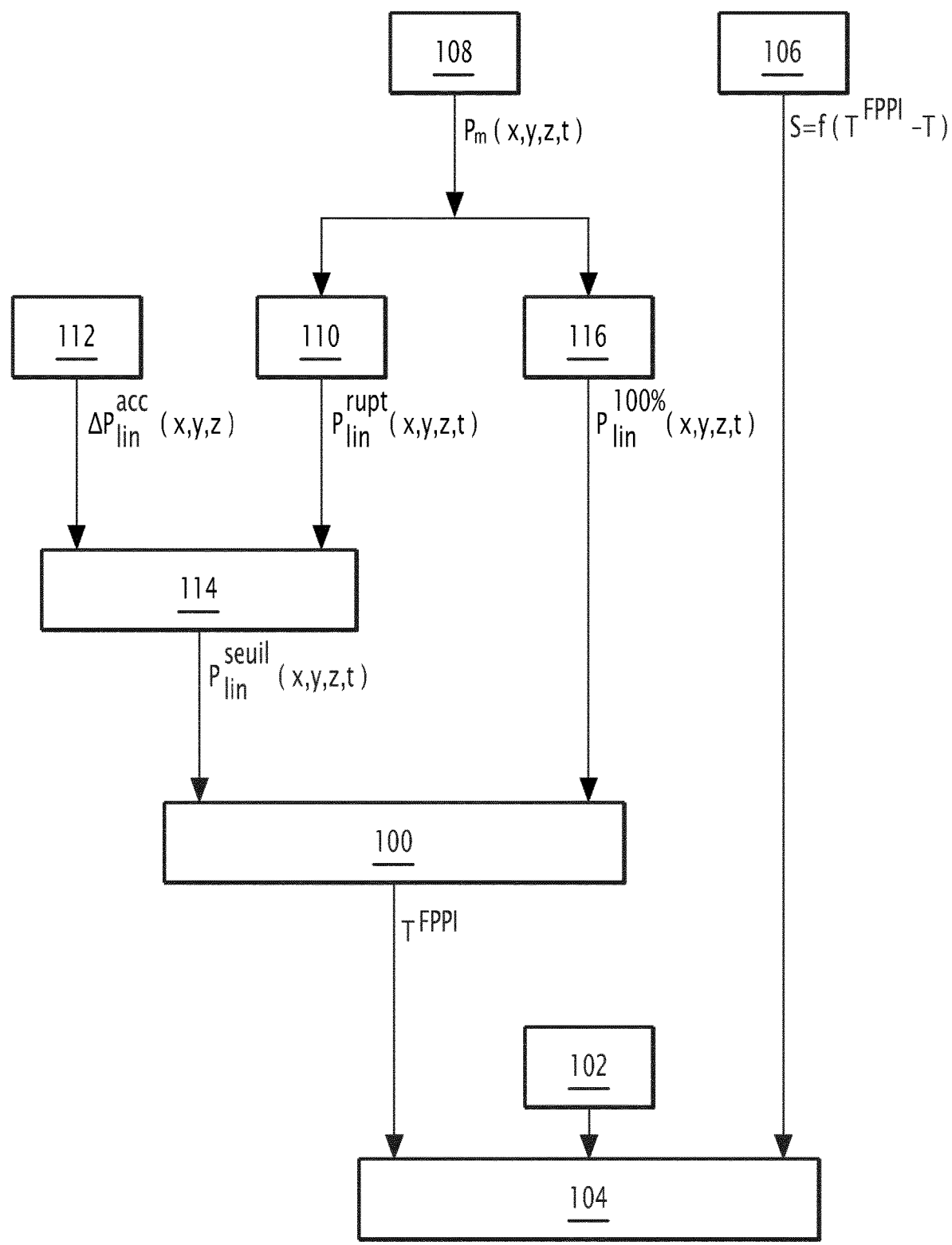
FIG. 4 is a flowchart illustrating successive steps of a monitoring method implemented in the reactor of FIG. 1.

As illustrated by FIG. 3, each fuel rod 24 traditionally comprises a cladding 33 in the form of a tube closed at its lower end by a lower stopper 34 and at its upper end by an upper stopper 35. The rod 24 comprises a series of pellets 36 stacked in the cladding 33 and bearing against the lower stopper 34. A maintaining spring 40 is positioned in the upper segment of the cladding 33 to bear on the upper stopper 35 and on the upper pellet 36.

Conventionally, the pellets 36 have a base of uranium oxide and the cladding 33 is made from zirconium alloy.

In FIG. 3, which corresponds to a fuel rod 24 derived from manufacturing and before irradiation, radial play J exists between the pellets 36 and the cladding 33. This is illustrated more particularly by the circled enlarged part of FIG. 3.

It is this play J that closes during conditioning and reconditioning of the fuel rod, and that opens during deconditioning of the fuel rod.

As illustrated by FIG. 1, the reactor 1 also comprises a computer 40. The computer 40 is for example the system used more generally to command and control the operation of the nuclear reactor 1.

This computer 40 for example comprises an information processing unit 42 comprising one or several processors, data storage means 44, input/output means 46 and optionally display means 48. The storage means 44, which for example comprise one or several memories, store one or several computer programs to execute the steps disclosed below.

The system 40 is coupled to the various sensors for measuring operating parameters of the nuclear reactor 1, including the sensors 21A to 21D.

A method for monitoring a nuclear reactor, for example, of the type previously disclosed will now be disclosed.

The method comprises the following steps:
determining 100 at least one operating time limit $T^{FPPI}$ for the operation at a reduced power of the nuclear reactor,
operating 102 the nuclear reactor at the reduced power, and
relaxing 104 at least one protection threshold of the nuclear power plant.

The method preferably comprises the following steps:
determining 106 a relationship of the relaxing,
measuring and/or calculating 108 the distribution of the power $P_m(x, y, z, t)$,
calculating 110 a linear rupture power $F_{lin}^{rupt}(x, y, z, t)$ at any point of the core and as a function of time,
calculating 112 a maximum linear power variation $\Delta P_{lin}^{acc}(x, y, z)$ at any point of the core caused by accidental spikes,
calculating 114 a threshold linear power $P_{lin}^{threshold}(x, y, z, t)$, and
calculating 116 a linear power at 100% $P_{lin}^{100\%}(x, y, z, t)$.

The time limit $T^{FPPI}$ is determined in step 100 in particular so as to avoid a rupture of at least one of the claddings, in particular during a power increase spike taking place during the operation of the nuclear reactor at reduced power, but also during and after the transition of the reactor to an operation at nominal power.

Indeed, when the nuclear reactor is operating at reduced power, the fuel rods are no longer conditioned. For example, the fuel pellets retract and a play appears between the fuel and the cladding. This play next decreases due to the creep of the cladding inward, since the pressure of the primary circuit is greater than the inner pressure of the rods.

When the nuclear reactor again transitions to nominal power, the play closes completely and the forces on the cladding increase.

The time limit $T^{FPPI}$ is calculated in real time and continuously, in particular when the reactor operates at reduced power. When the reactor returns to nominal power, the time limit $T^{FPPI}$ increases owing to the reconditioning of the fuel rods, this evolution being calculated in real time and continuously. This precise calculation in real time and continuously in particular makes it possible to obtain a time limit greater than a time desired by the operator and allows the conversion of the residual time into relaxing of the protection threshold.

An exemplary method for calculating the time limit $T^{FPPI}$ is disclosed hereinafter.

Then, the reactor operates in step 102 at reduced power (ERPO) for an actual time strictly less than the time limit $T^{FPPI}$.

The reduced power corresponds to a power for example less than or equal to about 92% of its nominal power PN.

A residual time is defined as the difference between the time limit and the actual time. The residual time is therefore positive.

Lastly, at least one protection threshold of the power plant is relaxed 104 as a function of the residual time.

The protection threshold is for example a maximum linear power leading, for example, to the automatic stopping of the reactor when it is crossed.

For reactors whose protection system is capable of estimating a maximum linear power in real time and continuously, this threshold is for example defined from neutron flux measurements of the ex-core detectors 21C. These ex-core flux detectors here are multi-staged, which makes it possible to estimate an average power as a function of the axial side using a reconstruction algorithm. This axial power form combined with axial power factors by clustered configuration makes it possible to estimate the maximum linear power of the core.

For a reactor such as the European pressurized reactor (EPR), this estimate is done from "in-core" flux detectors therefore arranged inside the core.

The protection threshold corresponds to an absolute threshold not to be exceeded at any point of the core.

The protection threshold for example depends on an axial power imbalance, that is to say, a power difference between the bottom and the top of the core.

When the power distribution is not too imbalanced toward the top or the bottom of the core, that is to say, the axial power imbalance is in a certain interval around 0, the axial concentration of this power is not sufficient for the local power to reach a value that may lead to a rupture by PCI. The protection threshold is then set at the value protecting the fuel from melting. Conversely, when the axial power imbalance is great enough in absolute value, that is to say, the value of the axial power imbalance is outside the aforementioned interval, the axial power concentration is sufficient to lead to a local power able to cause a rupture by PCI; the high linear power protection threshold is then dimensioned to avoid this rupture.

In the disclosed example, the relaxation 104 of the protection threshold as a function of the residual time is calculated by a relaxation or relaxing relationship.

"Relaxed" refers to an increase in the protection threshold.

The increase is for example valid until the end of an operating cycle independently of the operating mode. Alternatively, an operator can decrease the protection threshold of the power plant again, so as to subsequently redistribute the relaxation.

The determination 106 of the relaxation relationship is done before the operation 102 of the reactor, for example, in an engineering firm.

An exemplary method for calculating the time limit $T^{FPPI}$ is disclosed hereinafter.

A measurement and/or a calculation 108 of the distribution of the linear power $P_m$ (x, y, z, t) is done at any point of the core as a function of time, for example using measuring sensors. This for example involves a reconstruction combining measurements and calculations.

The reconstruction 108 is for example done regularly with a certain time pitch.

From the distribution of the linear power, a thermomechanical state of the rods of the core, that is to say, here the thermomechanical state between the cladding and the fuel pellets, is calculated by a thermomechanical calculating code. This is therefore, in overview, a stress field in the cladding due to potential pressure of the pellet on the cladding, or the size of the play between the pellet and the cladding when this play reopens in case of ERPO.

The thermomechanical state of the core in particular depends on the conditioning of the rod.

From the knowledge of this thermomechanical state, the linear rupture power $P_{lin}^{rupt}$ (x, y, z, t) is calculated in step 110 using a thermomechanical code implemented by the computer.

The calculation 110 of the linear rupture power $P_{lin}^{rupt}$ (x, y, z, t) is done with a time constant in the order of an hour.

Preferably, in an engineering firm, the maximum linear power variation $\Delta P_{lin}^{acc}$(x, y, z) induced by accidental spikes is calculated 112 at any point of the core.

The maximum linear power variation $\Delta P_{lin}^{acc}$(x, y, z) is an input datum of the monitoring system.

The maximum variation corresponds to the maximum value of the set of linear power variations obtained by static power distribution calculations of the core from limit conditions coming from the simulation of limiting accidental spikes with respect to the rupture by PCI.

Preferably, said simulated transitions are the so-called category 2 accidental transitions causing the strongest and fastest power variations in the core.

These spikes are, for example:
the excessive load increase,
the uncontrolled removal of power control clusters, and
the fall of control clusters.

This is, for example, disclosed in patent FR 2,924,852 B1.

From the linear rupture power $P_{lin}^{rupt}$(x, y, z, t) and the maximum linear power variation $\Delta P_{lin}^{acc}$ (x, y, z), the threshold linear power $P_{lin}^{treshold}$(x, y, z, t) is calculated in step 114.

The threshold linear power $P_{lin}^{threshold}$(x, y, z, t) here in equal to the difference between the linear rupture power $P_{lin}^{rupt}$(x, y, z, t) and the maximum variation induced by accidental spikes $\Delta P_{lin}^{acc}$(x, y, z), that is to say, $P_{lin}^{threshold}$ (x, y, z, t)=$P_{lin}^{rupt}$(x, y, z, t)–$\Delta P_{lin}^{acc}$(x, y, z).

The linear power threshold is calculated at any point of the core and as a function of time.

The power distribution of the core must be such that at any point of the core, the linear power is below the threshold linear power.

The power distribution is, for example, calculated and normalized on the core, such that $P_{lin}$(x, y, z, t)=P(x, y, z, t)*$P_{linnom}$*$P_{rel}$ with $P_{in}$ the linear power at a point of the core, P the local power normalized at 1 on the entire core at a point of the core, $P_{linnom}$ the nominal average linear power on the core and $P_{rel}$ the power level as a fraction of the nominal.

More specifically, the normalized power P(x, y, z, t) is equal to the linear power $P_{lin}$(x, y, z, t) divided by the average value on the core of this power $\langle P_{lin}(x, y, z, t)\rangle_{core}$, or:

$$P(x, y, z, t) = \frac{P_{lin}(x, y, z, t)}{\langle P_{lin}(x, y, z, t)\rangle_{core}}.$$

The average linear power $\langle P_{lin}(x, y, z, t)\rangle_{core}$ is also equal to the average linear power at nominal power multiplied by the power level in fraction: $\langle P_{lin}(x, y, z, t)\rangle_{core}$=$P_{linnom}$*$P_{rel}$, yielding the preceding equation.

Indeed, at any moment, the linear power must be such that, if a power spike occurs, the linear power remains below the linear power that may cause a rupture of the cladding. Thus, even in case of power spike, the cladding does not give.

The threshold linear rupture here is recalculated each time the linear rupture power $P_{lin}^{rupt}$ (x, y, z, t) is calculated.

Furthermore, the linear power at 100% is calculated in step 116 from the distribution of the power $P_m$(x, y, z, t).

The linear power at 100% $P_{lin}^{100\%}$(x, y, z, t) corresponds to an estimate of the linear power at any point of the core and as a function of time if the reactor was brought quickly from its current state to an operation at nominal power.

Knowing the state of the core at each moment, the monitoring system is able to calculate what the state of the core would be if the reactor were made to operate at nominal power from the considered moment.

The time limit is next determined in step 100 as a function of the difference between the threshold linear power and the linear power at 100% $P_{lin}^{100\%}$ (x, y, z, t).

Yet as previously stated, the linear power is meant to stay below the threshold linear power $P_{lin}^{threshold}$(x, y, z, t).

The subtraction of the threshold linear power from the 100% linear power, that is to say, the difference $P_{lin}^{threshold}$ (x, y, z, t)–$P_{lin}^{100\%}$(x, y, z, t), is meant to stay greater than or equal to zero.

Thus, the time limit $T^{FPPI}$ is determined in step 100 such that for each moment t less than $T^{FPPI}$, the difference $P_{lin}^{threshold}$ (x, y, z, t)–$P_{lin}^{100\%}$(x, y, z, t) is greater than or equal to zero.

The power distribution in nominal operation is of interest because it is in this state that the difference $P_{lin}^{threshold}$(x, y, z, t)–$P_{lin}^{100\%}$(x, y, z, t) is minimal.

$P_{lin}^{threshold}$ (x, y, z, t) decreases as a function of time when the reactor operates in ERPO. $P_{lin}^{100\%}$(x, y, z, t) fluctuates slightly when the reactor operates in ERPO at stabilized power.

The difference $P_{lin}^{threshold}(x, y, z, t) - P_{lin}^{100\%}(x, y, z, t)$ decreases globally as a function of time when the reactor operates in ERPO at stabilized power, that is to say, the time limit becomes smaller as one transitions to reduced power operation.

The operator is then able to determine the extent to which he can operate the reactor in reduced power operation.

In a variant, the time limit $T^{FPPI}$ is calculated by a method implementing other calculations, like that disclosed in patent FR 2,924,852 B1.

This monitoring method makes it possible to obtain a time limit greater than what was obtained previously. Thus, whereas previously, the operator generally operated the reactor at reduced power during a time close to the time limit, this being less than what is obtained using the monitoring method of the present disclosure, today there is a margin between the time limit and the duration during which the operator wishes to operate the reactor at reduced power.

This calculating method also makes it possible to determine the time limit by taking account of the characteristics of all of the fuel types present in the core, since the thermomechanical calculations done online to determine, at each moment, the conditioning of the fuel rods take account of the characteristics of each fuel type present in the core.

The monitoring method uses the margin between the time limit and the actual operating time of the reduced power reactor, so as to increase the maneuverability of the reactor by increasing at least one protection threshold while guaranteeing safe operation during the use of the core.

The invention claimed is:

1. A method for monitoring a nuclear reactor comprising a core in which fuel assemblies are loaded, each fuel assembly comprising nuclear fuel rods each including nuclear fuel pellets and a cladding surrounding the nuclear fuel pellets, the method comprising the following steps:
   determining at least one operating time limit for an operation at a reduced power of the nuclear reactor, so as to avoid a rupture of at least one of the claddings, the reduced power being inferior or equal to 92% of a nominal power of the nuclear reactor;
   operating the nuclear reactor at the reduced power for an actual time strictly less than the operating time limit;
   measuring and/or calculating a distribution of a linear power at any point of the core as a function of time;
   relaxing a threshold linear power of the nuclear reactor as a function of a difference between the operating time limit and the actual time, the threshold linear power being a threshold of the linear power at any point of the core below which a rupture by Pellet/Cladding Interaction is avoided; and
   further operating the nuclear reactor at the reduced power according to the threshold linear power from the relaxing step.

2. The monitoring method according to claim 1, wherein the relaxing of the threshold linear power of the nuclear reactor as a function of the difference between the operating time limit and the actual time is performed based on a relaxation relationship between the threshold linear power and the difference between the operating time limit and the actual time, the method further comprising determining the relaxation relationship before the operating of the nuclear reactor at the reduced power.

3. The monitoring method according to claim 1, further comprising the following steps before the determining of the operating time limit:
   calculating the threshold linear power; and
   calculating a linear power at 100%, the linear power at 100% being an estimate of the linear power at any point of the core and as a function of time if the nuclear reactor is operating at nominal power, said linear power at 100% being calculated from the measured and/or calculated distribution of the linear power at any point of the core as a function of time,
   the determining of the operating time limit being made as a function of a difference between the threshold linear power and the linear power at 100%.

4. The monitoring method according to claim 3, wherein the threshold linear power is calculated at any point of the core and as a function of time, a power distribution of the core being such that at any point of the core, a linear power is below the threshold linear power.

5. The monitoring method according to claim 3, further comprising the following steps before calculating the threshold linear power:
   calculating a rupture linear power at any point of the core and as a function of time; and
   calculating a maximum linear power variation at any point of the core caused by accidental spikes,
   the threshold linear power being equal to a difference between the rupture linear power and the maximum variation induced by accidental spikes.

6. The monitoring method according to claim 5, wherein the rupture linear power is calculated by a thermomechanical code from a thermomechanical state of the core, the thermomechanical state of the core being known by the measurement and/or the calculation of the distribution of the power at any point of the core as a function of time.

7. The monitoring method according to claim 6, wherein the calculation of the rupture linear power is done at least once every two hours, the threshold linear power then also being recalculated.

8. The monitoring method according to claim 1, further comprising returning the nuclear reactor to nominal power; and
   recalculating the operating time limit in real time and continuously, including increasing the operating time limit upon the returning of the nuclear reactor to nominal power.

9. The monitoring method according to claim 1, wherein the measuring and/or calculating the distribution of the linear power at any point of the core as a function of time includes estimating a maximum linear power in real time and continuously.

10. The monitoring method according to claim 1, wherein the threshold linear power from the relaxing step depends on an axial power imbalance, the axial power imbalance being a power difference between a bottom and a top of the core.

11. A computer program on a non-transitory computer readable medium comprising instructions for executing steps of the method according to claim 1.

12. The non-transitory computer readable medium usable in a computer and on which the program according to claim 11 is recorded.

13. A method for monitoring a nuclear reactor comprising a core in which fuel assemblies are loaded, each fuel assembly comprising nuclear fuel rods each including nuclear fuel pellets and a cladding surrounding the nuclear fuel pellets, the method comprising the following steps:

determining at least one operating time limit for an operation at a reduced power of the nuclear reactor, so as to avoid a rupture of at least one of the claddings, the reduced power being inferior or equal to 92% of a nominal power of the nuclear reactor;

operating the nuclear reactor at the reduced power for an actual time strictly less than the operating time limit;

measuring and/or calculating a distribution of a linear power at any point of the core as a function of time and determining from the distribution of the linear power a thermomechanical state between the cladding and the nuclear fuel pellets;

recalculating the operating time limit in real time as a function of the thermomechanical state between the cladding and the nuclear fuel pellets;

relaxing a threshold linear power of the nuclear reactor as a function of a difference between the operating time limit and the actual time, the threshold linear power being a threshold of the linear power at any point of the core below which a rupture by Pellet/Cladding Interaction is avoided even in case of a power spike or a transition to operation at nominal power; and further operating the nuclear reactor at the reduced power according to the threshold linear power from the relaxing step.

14. The monitoring method according to claim 13, wherein the recalculating the operating time limit in real time as a function of the thermomechanical state between the cladding and the nuclear fuel pellets includes:

calculating a rupture linear power of the cladding of the nuclear fuel rods at any point of the core and as a function of the thermomechanical state between the cladding and the nuclear fuel pellets.

15. The monitoring method according to claim 14, wherein the recalculating the operating time limit in real time as a function of the thermomechanical state between the cladding and the nuclear fuel pellets further includes:

calculating the threshold linear power as a function of the rupture linear power and a maximum linear power variation induced by accidental spikes at any point of the core.

16. The monitoring method according to claim 15, wherein the recalculating the operating time limit in real time as a function of the thermomechanical state between the cladding and the nuclear fuel pellets further includes:

calculating a linear power at 100%, the linear power at 100% being an estimate of the linear power at any point of the core and as a function of time if the nuclear reactor is operating at the nominal power, the recalculating of the operating time limit being performed as a function of a difference between the threshold linear power and the linear power at 100%.

17. The monitoring method according to claim 13, wherein the recalculating the operating time limit in real time as a function of the thermomechanical state between the cladding and the nuclear fuel pellets includes:

calculating the threshold linear power as a function of the thermomechanical state between the cladding and the nuclear fuel pellets;

the recalculating of the operating time limit being performed such that for each moment less than the operating time limit, a difference between the threshold linear power and a linear power at 100% is greater than or equal to zero, the linear power at 100% being an estimate of the linear power at any point of the core and as a function of time if the nuclear reactor is operating at nominal power.

18. A method for monitoring a nuclear reactor comprising a core in which fuel assemblies are loaded, each fuel assembly comprising nuclear fuel rods each including nuclear fuel pellets and a cladding surrounding the nuclear fuel pellets, the method comprising the following steps:

calculating a threshold linear power; and calculating a linear power at 100%, the linear power at 100% being an estimate of the linear power at any point of the core and as a function of time if the nuclear reactor is operating at nominal power from a measurement and/or a calculation of a distribution of an actual power at any point of the core as a function of time, determining at least one operating time limit for an operation at a reduced power of the nuclear reactor as a function of a difference between the threshold linear power and the linear power at 100%, so as to avoid a rupture of at least one of the claddings, the reduced power being inferior or equal to 92% of a nominal power of the nuclear reactor;

operating the nuclear reactor at the reduced power for an actual time strictly less than the operating time limit; and relaxing the threshold linear power of the nuclear reactor as a function of a difference between the operating time limit and the actual time; and further operating the nuclear reactor at the reduced power according to the threshold linear power from the relaxing step.

19. The monitoring method according to claim 18, further comprising the following steps before calculating the threshold linear power:

calculating a rupture linear power at any point of the core and as a function of time; and calculating a maximum linear power variation at any point of the core caused by accidental spikes, the threshold linear power being equal to a difference between the rupture linear power and the maximum variation induced by accidental spikes.

* * * * *